United States Patent
Grove-Nielsen

(10) Patent No.: US 9,738,055 B2
(45) Date of Patent: Aug. 22, 2017

(54) FIBER-REINFORCED COMPOSITE, A COMPONENT AND A METHOD

(71) Applicant: Siemens Aktiengesellschaft, Munich (DE)

(72) Inventor: Erik Grove-Nielsen, Roslev (DK)

(73) Assignee: Siemens Aktiengesellschaft, Munich (DE)

( * ) Notice: Subject to any disclaimer, the term of this patent is extended or adjusted under 35 U.S.C. 154(b) by 115 days.

(21) Appl. No.: 14/587,353

(22) Filed: Dec. 31, 2014

(65) Prior Publication Data

US 2015/0251380 A1    Sep. 10, 2015

(30) Foreign Application Priority Data

Mar. 10, 2014   (EP) .................................. 14158528

(51) Int. Cl.
*B32B 5/12*     (2006.01)
*B29C 70/30*    (2006.01)
*B29C 70/22*    (2006.01)
*B29K 105/10*   (2006.01)
*B29L 31/08*    (2006.01)

(52) U.S. Cl.
CPC .............. *B32B 5/12* (2013.01); *B29C 70/226* (2013.01); *B29C 70/30* (2013.01); *B29K 2105/108* (2013.01); *B29K 2995/0077* (2013.01); *B29L 2031/085* (2013.01); *B32B 2262/02* (2013.01); *B32B 2262/0223* (2013.01); *B32B 2262/0246* (2013.01); *B32B 2262/0253* (2013.01); *B32B 2262/0276* (2013.01); *B32B 2262/0284* (2013.01); *Y10T 428/24124* (2015.01)

(58) Field of Classification Search
CPC ........................................................ B32B 5/12
USPC ......................................................... 428/113
See application file for complete search history.

(56) References Cited

U.S. PATENT DOCUMENTS

2015/0041081 A1*   2/2015   Banu .................. D21C 1/02
                                                                162/13

FOREIGN PATENT DOCUMENTS

| EP | 2123431 A1 | 11/2009 | |
|---|---|---|---|
| EP | 2687356 A1 | 1/2014 | |
| FI | EP 2687356 A1 * | 1/2014 | .......... B29C 70/547 |
| FI | WO 2014013138 A1 * | 1/2014 | .......... B29C 70/547 |
| WO | 2014013138 A1 | 1/2014 | |

* cited by examiner

*Primary Examiner* — Brent O'Hern
(74) *Attorney, Agent, or Firm* — Beusse Wolter Sanks & Maire

(57) ABSTRACT

A fiber reinforced composite, a component for a wind turbine and a method for manufacturing a component for a wind turbine are provided. The fiber reinforced composite includes a plurality of first fibers, the first fibers being arranged in a unidirectional or biax-configuration, a plurality of second fibers, the second fibers being arranged perpendicularly with respect to a lengthwise direction of the first fibers, and a resin impregnating the first and second fibers, wherein a E-modulus of the resin equals an E-modulus of the second fibers. Since the E-modulus of the resin and the E-modulus of the second fibers are equal, an early initiation of fatigue cracks is avoided.

18 Claims, 4 Drawing Sheets

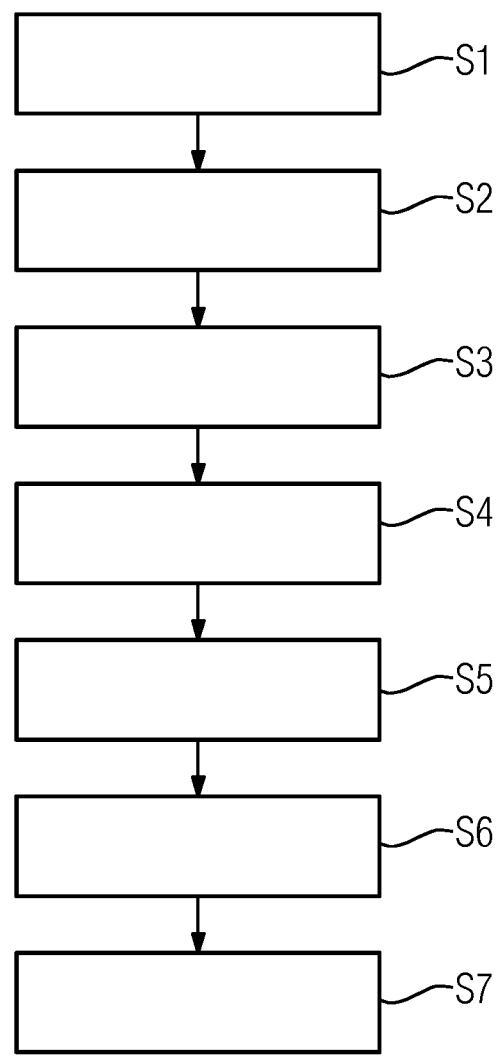

FIBER-REINFORCED COMPOSITE, A COMPONENT AND A METHOD

CROSS REFERENCE TO RELATED APPLICATIONS

This application claims the benefit of European Application No. EP14158528 filed Mar. 10, 2014, incorporated by reference herein in its entirety.

FIELD OF INVENTION

The present invention relates to a fiber-reinforced composite, a component and a method.

BACKGROUND OF INVENTION

Modern wind turbine rotor blades are built from fiber-reinforced composites combined with core members, such as balsa wood or plastic foam.

For example, EP 2 123 431 A1 describes a method for manufacturing a rotor blade using a vacuum-assisted resin transfer molding (VARTM)-process. In a first step of the manufacturing process, fiber material is laid onto a lower part and an upper part of a mold, respectively. The fiber material is secured in place by vacuum applied from beneath. Then, mold cores are covered in vacuum bags and are placed in the lower part of the mold together with a web (also known as a shear web). Next, the upper part of the mold, together with the fiber material is turned 180° about its longitudinal axis and put into place so that the mold is closed. In a further step, a vacuum is applied to the space between the mold cores and the mold. Then, resin is injected. When the resin has set, the mold is opened and the cured blade is removed from the mold.

Since the fiber material has a much higher stiffness than the cured resin, it is intended to achieve the highest possible fiber content. A typical E-modulus of the resin is 3 GPa and a typical E-modulus for a glass fiber material is 75 GPa or more. The E-modulus for carbon fibers can be, for example, 240 GPa.

It is well known that unidirectional (UD) laminates have a lower resistance to transverse loads. This can be attributed to bonding failures at the interface between the resin and the fiber material when the stress direction is perpendicular to the fiber surface.

To improve the resistance to transverse loads of unidirectional laminates (in final use or during handling and transportation), it is known to reinforce these with transverse stabilizing fibers. When the unidirectional laminate is loaded in its main direction (corresponding to the lengthwise direction of the fibers), the transverse stabilizing fibers are loaded perpendicularly to their lengthwise axes.

It has been discovered that fatigue damages in these kinds of laminates are regularly initiated by bonding failures at the interface between the resin and the transverse stabilizing fibers.

SUMMARY OF INVENTION

One object of the present invention is to provide an improved fiber-reinforced composite. A further objective is to provide an improved component for a wind turbine. Even further, it is an objective to provide an improved method for manufacturing a component for a wind turbine.

Accordingly, a fiber-reinforced composite for manufacturing a component for a wind turbine is provided. The fiber-reinforced composite comprises: a plurality of first fibers, the first fibers being arranged in a unidirectional or biax-configuration, a plurality of second fibers, the second fibers being arranged perpendicularly with respect to a lengthwise direction of the first fibers, and a resin impregnating the first and second fibers, wherein the E-modulus of the resin equals an E-modulus of the second fibers.

Since the E-modulus of the resin and the E-modulus of the second fibers are equal, an early initiation of fatigue cracks is avoided. One reason for this is that, by the resin and the second fibers having the same E-modulus, a stress gradient on the surface of the second fibers is reduced. Another reason may be attributed to the Poisson effect: As the first fibers and the resin are stretched in the main direction (lengthwise direction), a contraction of the resin material occurs due to the Poisson effect. Having now transverse second fibers with an E-modulus equal to the resin allows the second fibers to contract at the same rate as the resin. Thus, stresses at the interface between the second fibers and the resin are avoided.

By the E-modulus of the resin being equal to the E-modulus of the second fibers it is meant that the E-moduli are equal or substantially equal. "Substantially equal" is to be interpreted in the light of the first fibers typically having a very large E-modulus of 70 GPa (or more) in the case of glass fibers, or 240 GPa (or more) in the case of carbon fibers. Thus, even an E-modulus of the second fibers which is a multiple of the E-modulus of the resin (or vice versa) may still be small and thus equal to that of the resin when considering the high E-modulus of the first fibers: For example, the E-modulus of the second fibers may be up to 5 times, or 3 times, or even 2 times or even 1.5 times the E-modulus of the resin. In an alternative embodiment, the E-modulus of the resin may be up to 5 times, or 3 times, or even 2 times or even 1.5 times the E-modulus of the second fibers. According to an embodiment, the E-modulus of the first fibers is larger than 60 GPa, or larger than 100 GPa or even larger than 200 GPa.

"Unidirectional" is to say that all the first fibers extend in a single direction (herein called the lengthwise direction). "Biax" is to say that the first fibers are arranged at angles of +45° and −45° with respect to a direction herein called the "lengthwise direction".

By the second fibers being arranged "perpendicularly" with respect to the lengthwise direction of the first fibers, it is meant that an angle between a respective second fiber and a respective first fiber lies within the range of 90°±45°, or 90°±20° or even 90°±5°.

Examples of a resin which may be used for impregnating the first and second fibers are epoxy, polyester, vinylester or any other suitable thermoplastic or duroplastic material.

The term "fiber" in relation to the "second fibers" is to be understood in a broad sense and to include fibers, yarns, fiber filaments, beads (of adhesive, for example), bands, strips, strings or the like. Advantageously, the diameter of a respective second fiber is smaller than the diameter of a respective first fiber.

According to an embodiment, the E-modulus of the resin and the second fibers is smaller than the E-modulus of the first fibers.

Advantageously, the E-modulus of the first fibers is much larger than that of the resin or the second fibers as explained above.

According to a further embodiment, the second fibers are made of a thermoplastic material and/or of a resin. These materials typically have a E-modulus equal to that of the resin impregnating the first and second fibers.

According to a further embodiment, the second fibers are made of an epoxy resin, polyethylene terephthalate (PET/PETP) or polyester.

The epoxy resin as well as PETP, PET or polyester have an E-modulus in the range of 2-4, or 2.5-3.5 GPa and are therefore well suited for the intended application.

Further, the second fibers may be made of acrylic, polycarbonate, polyimide, ABS or polypropylene.

These materials may have an E-modulus ranging from 1-4 GPa, or from 1.5-2 GPa.

The second fibers may also comprise combinations of the materials mentioned above.

According to a further embodiment, the second fibers each comprise multiple filaments.

The filaments are combined to form a rigid yarn. The filaments may, for example, be made of a thermoplastic material.

According to a further embodiment, each filament has a diameter ranging from 2-20 µm.

According to a further embodiment, the second fibers are each formed as a single fiber.

In other words, a respective single fiber is made from a single, connected piece of material. The single fibers may be made of a thermoplastic material, for example.

According to a further embodiment, the diameter of a respective single fiber ranges from 50-500 µm.

According to a further embodiment, the single fibers may be, for example, made of a thermosetting resin.

According to a further embodiment, the E-modulus of the second fibers and the resin is in the range of 1-6 GPa. Advantageously, the E-modulus is in the range of 2-4, or even, 2.5-3.5 GPa.

According to a further embodiment, the second fibers are attached to the first fibers by means of a stitching yarn. For example, a stitching yarn made of PET may be used.

According to a further embodiment, the second fibers are treated with a coupling agent. The coupling agent improves the mechanical connection at the interface between the second fibers and the resin.

Further, a component for a wind turbine, in particular a rotor blade, is provided. The component comprises the fiber-reinforced composite described above.

Furthermore, a method for manufacturing a component for a wind turbine, in particular the component described above, is provided. The method comprises the steps of a) providing a fiber material comprising a plurality of first fibers, the first fibers being arranged in a unidirectional or biax-configuration, and a plurality of second fibers, the second fibers being arranged perpendicularly with respect to a lengthwise direction of the first fibers, b) laying the fiber material onto a mold surface, and c) curing a resin impregnating the first and second fibers to form the component.

The fiber material comprising the first and second fibers may be supplied in a pre-impregnated state (so-called prepreg material) or in an unimpregnated state. In the latter case, the fiber material is impregnated with the resin before step c). For example, the resin may be injected into the fiber material in a resin transfer molding (RTM) or vacuum-assisted resin transfer molding (VARTM)-process. In a VARTM-process, for example, the fiber material is covered in a vacuum bag. In a further step, a vacuum is applied to the region between the vacuum bag and the mold surface. Then, resin is injected in said region. After the resin has set or has been cured—typically by the addition of external heat—the vacuum bag and/or the mold is removed and the final component, for example the rotor blade, is obtained. Of course, when using a prepreg material, there is no need to inject the fiber material with resin.

Generally speaking, the mold may be an open or a closed mold. For example, the mold may comprise one or more parts, in particular a lower part and an upper part.

"Cured" or "set" refers to a resin being hardened and/or cross-linked to an extent where the shape of the fiber material impregnated with the resin will not or not change significantly any more.

"a)", "b)" and "c)" are not to imply a fixed order of the method steps. Rather, the steps a) to c) may be carried out in a different order where appropriate in the mind of the skilled person.

"Layup" as used herein refers to one or more layers of fiber material.

"Wind turbine" presently refers to an apparatus converting the wind's kinetic energy into rotational energy, which may again be converted to electrical energy by the apparatus.

Further possible implementations or alternative solutions of the invention also encompass combinations—that are not explicitly mentioned herein—of features described above or below with regard to the embodiments. The person skilled in the art may also add individual or isolated aspects and features to the most basic form of the invention.

BRIEF DESCRIPTION OF THE DRAWINGS

Further objects, features and advantages of the present invention become apparent from the subsequent description and depending claims, taken in conjunction with the accompanying drawings, in which

FIG. 6 shows a flowchart in accordance with an embodiment of a method for manufacturing a component for a wind turbine.

In the Figures, like reference numerals designate like or functionally equivalent elements, unless otherwise indicated.

DETAILED DESCRIPTION OF INVENTION

Figure 1:
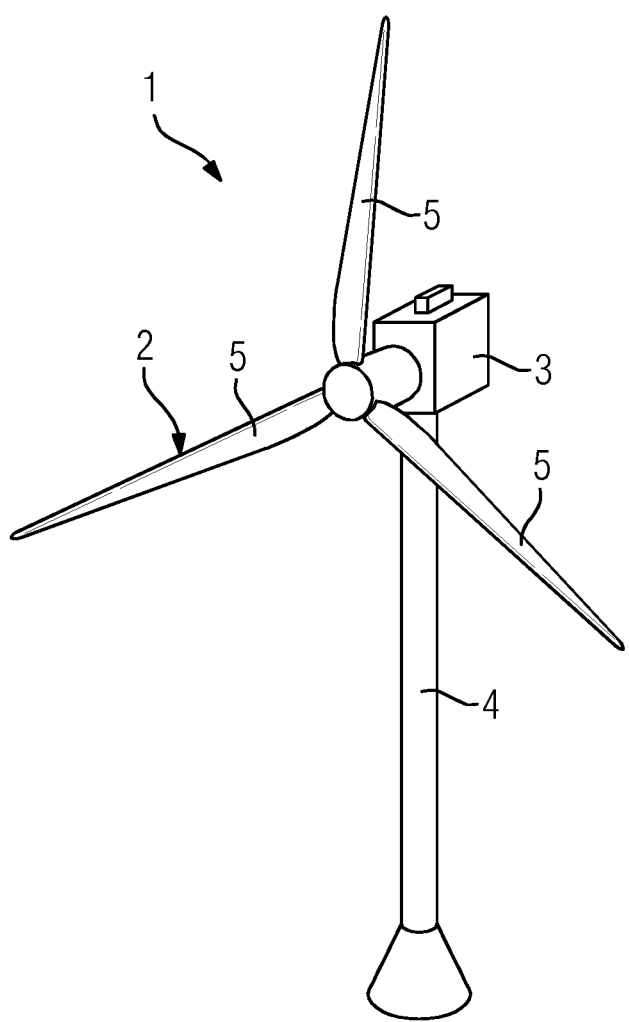
FIG. 1 is a perspective view of a wind turbine according to an embodiment.

FIG. 1 shows a wind turbine 1 according to an embodiment.

The wind turbine 1 comprises a rotor 2, connected to a generator (not shown) arranged inside a nacelle 3. The nacelle 3 is arranged at the upper end of a tower 4 of the wind turbine 1.

The rotor 2 comprises three blades 5. Rotors 2 of this kind may have diameters ranging from, for example, 30 to 160 meters. The blades 5 are subjected to high wind loads. At the same time, the blades 5 need to be lightweight. For these reasons, the blades 5 in modern wind turbines 1 are manufactured from fiber-reinforced composite material. Therein, glass fibers are generally preferred over carbon fibers for cost reasons. In addition, the blades 5 may each comprise one or more core members made of a lightweight material to reduce the weight of the blades 5.

Figure 2A:
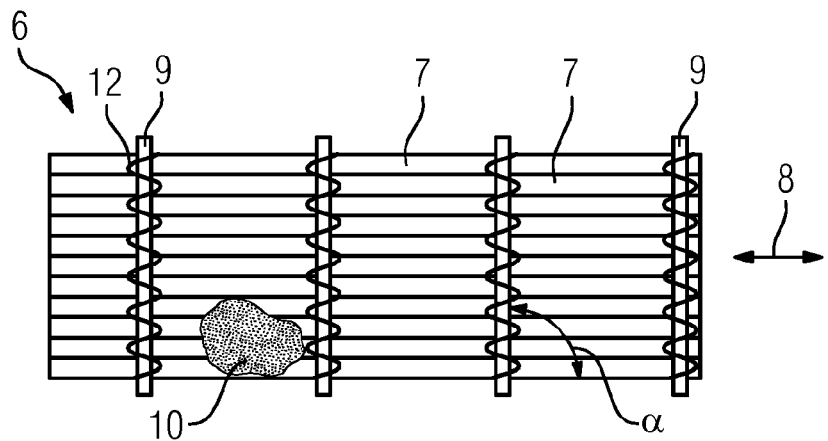
FIG. 2A shows a top view of a fiber-reinforced composite according to an embodiment.

FIG. 2A shows in a top view a fiber-reinforced composite 6 according to an embodiment.

The fiber-reinforced composite 6 comprises a plurality of first fibers 7. The first fibers 7 are configured as rovings, but may also take a different form. The first fibers 7 are arranged in a unidirectional configuration, i.e. all fibers 7 extend in the same direction 8 hereinafter referred to as the "lengthwise direction" of the first fibers 7.

Further, the fiber reinforced composite 6 comprises second fibers 9. The second fibers 9 may be configured as fibers, yarns, rovings, beads of adhesive, strings or bands of material.

The second fibers may be made of (partially or fully) epoxy resin, PETP, PET, polyester, acrylic, polycarbonate, polyimide, ABS, polypropylene or combinations thereof. Epoxy resin, PETP, PET, polyester may be preferred.

These materials used for making the second fibers are also given in the table below including corresponding E-modulus values (also called Young's modulus). However, the E-modulus values given are not to be understood in a limiting sense. Rather, these values correspond to preferred values.

TABLE

| Material | Youngs modulus/E-modulus [GPa] |
| --- | --- |
| Epoxy resin | 3 |
| PET, Polyester | 2-2.7 |
| Acrylic | 3.2 |
| Poly Carbonate | 2.6 |
| Poly imid | 2.5 |
| ABS | 2.3 |
| Poly propylene | 1.5-2 |

Now returning to FIG. 2A, the first and second fibers 7, 9 are embedded in a cured resin 10. FIG. 2A only shows a portion of the resin 10 for reasons of clarity. The resin 10 may comprise an epoxy resin, for example. As indicated in the table above, the epoxy resin has an E-modulus of 3 and is thus very similar to the E-modulus of the material of the second fibers 9.

Now considering the E-modulus of the first fibers, which may be made of glass fibers and/or carbon fibers having an E-modulus of 75 GPa and 240 GPa, respectively, the E-moduli of the resin 10 and the second fibers 9 are considered equal.

Figure 2B:
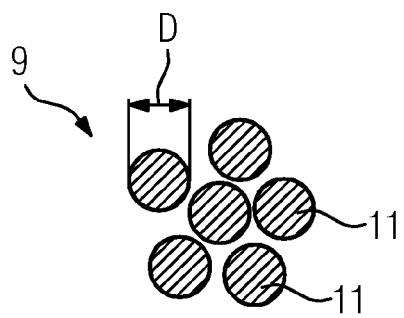
FIG. 2B shows an enlarged view from FIG. 2A according to an embodiment.
Figure 2C:
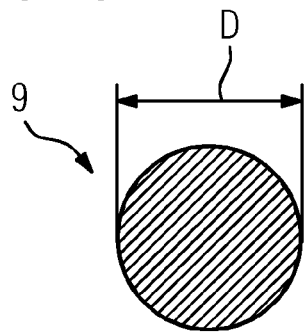
FIG. 2C shows an enlarged view from FIG. 2A according to a further embodiment.

An individual fiber 9 as shown in FIG. 2A may be configured has illustrated in FIG. 2B or 2C, for example.

According to the embodiment of FIG. 2B, the fiber 9 comprises multiple filaments 11. Each filament 11 may have a diameter D ranging from 2 to 20 μm, for example.

In the embodiment according to FIG. 2C, the fiber 9 is configured as a single fiber. The fiber 9 has a diameter D ranging from 50 to 500 μm, for example.

Now returning to FIG. 2A, it is shown that the second fibers 9 may be attached to the first fibers 7 by means of a stitching yarn 12.

Further, FIG. 2A illustrates that the second fibers 9 may extend at an angle α of 90° with respect to the lengthwise direction 8.

Figure 3:
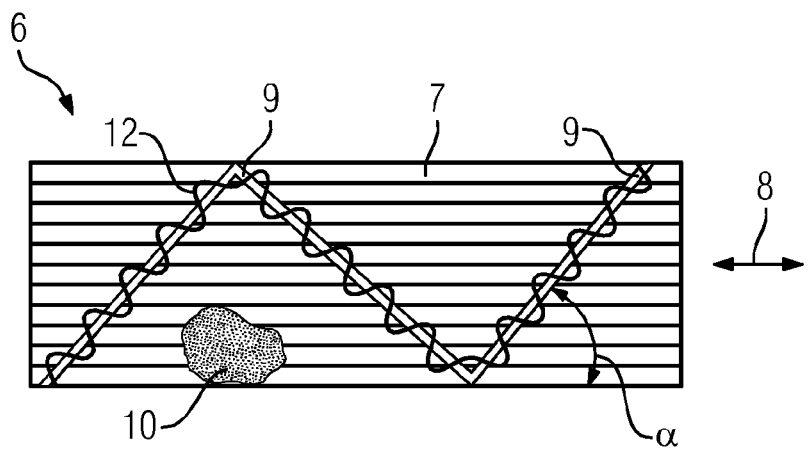
FIG. 3 shows a top view of a fiber-reinforced composite according to a further embodiment.

FIG. 3 shows a top view of a composite 6 according to a further embodiment.

The embodiment of FIG. 3 differs from the embodiment of FIG. 2A in that the second fibers 9 are arranged at an angle α of 45° with respect to the lengthwise direction 8. The second fibers 9 are thus arranged in a zigzag configuration. In other embodiments, the angle may range between 45° and 90°, or between 70° and 90°.

Figure 4:
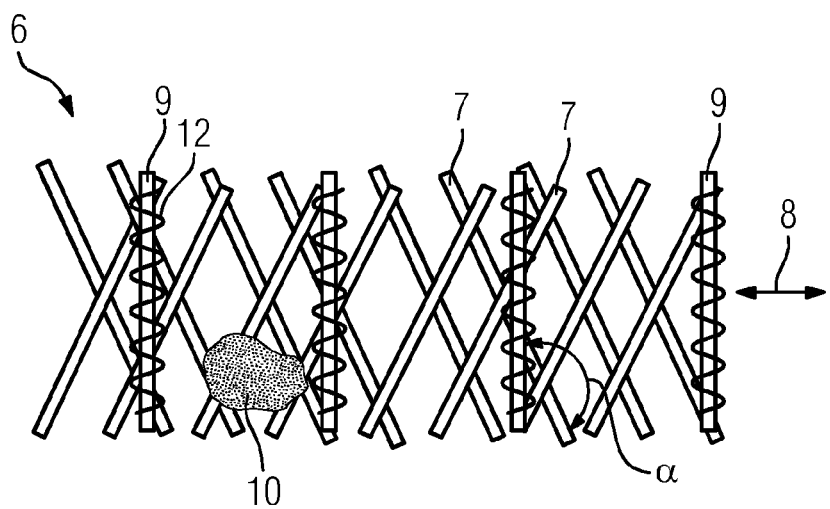
FIG. 4 shows a top view of a fiber-reinforced composite according to a further embodiment.

FIG. 4 shows a top view of a composite 6 according to a further embodiment.

The embodiment of FIG. 4 differs from the embodiment of FIG. 2A in that the first fibers 7 are arranged in a biax configuration. In other words, the first fibers 7 are arranged at angles of +/−45° with respect to the lengthwise direction 8.

Figure 5:
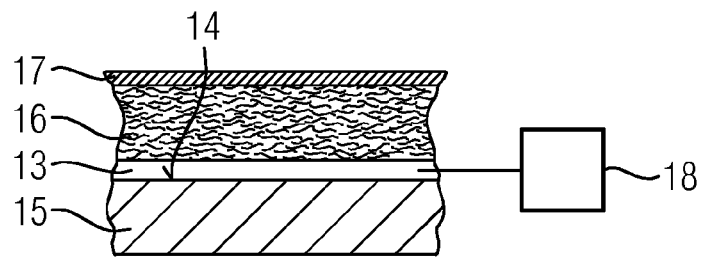
FIG. 5 shows a section view from a VARTM-process according to a method for manufacturing the rotor blade of FIG. 1.

FIG. 5 illustrates a section view from a VARTM-process in accordance of an embodiment of the present invention. Reference is also made to FIG. 6 illustrating a low diagram of a method for manufacturing a rotor blade 5 as shown in FIG. 1, for example.

In step S1 an (optional) vacuum distribution layer 13 is arranged on a mold surface 14 of a mold 15.

In a step S2, a fiber material 16 is provided. The fiber material 16 comprises first and second fibers 7, 9 as shown in FIGS. 2A to 4 above. The fibers 7, 9 may at this point be fastened together by a stitching yarn 12 to improve handling of the fibers 7, 9.

In a step S3, the fiber material 16 is arranged on top of the vacuum distribution layer 13, or directly on the mold surface 14 when no vacuum distribution layer 13 is provided.

In a step S4, the fiber material 16 is covered with a vacuum bag 17. Then vacuum is applied to the space between the vacuum bag 17 and the mold surface 14 by a vacuum pump 18.

In a further embodiment, the vacuum distribution layer 13 is arranged on top of the fiber material 16. Then, the vacuum bag 17 is arranged on top of the vacuum distribution layer 13.

In a step S5, a resin, in particular an epoxy resin, is injected into said space. The second fibers 9 may be treated with a coupling agent (not shown) before injecting the resin 10 in step S5.

In a step S6 external heat is applied to the mold 15 curing the epoxy resin.

After removing the vacuum bag 17 and/or opening the mold 18 (in the case of closed mold), the finished blade 5 may be removed from the mold in a step S7.

Of course, the steps S1 to S7 may be modified to include the positioning of a mold core (not shown) and/or a web (not shown) in the mold 15 to provide a blade of 5 reinforced by a web or balsa wood and/or foam core, for example.

Although the present invention has been described in accordance with preferred embodiments, it is obvious for a person skilled in the art that modifications are possible in all embodiments.

The invention claimed is:

1. A fiber reinforced composite for manufacturing a component for a wind turbine, comprising
   a plurality of first fibers, the fibers being arranged in an unidirectional or biax-configuration,
   a plurality of second fibers, the second fibers being arranged perpendicularly with respect to a lengthwise direction of the first fibers, and
   a resin impregnating the first and second fibers such that the first and second fibers are embedded in the resin, wherein a Young's modulus of the resin equals a Young's modulus of the second fibers, wherein the Young's modulus of the resin and the second fibers is smaller than the Young's modulus of the first fibers.

2. The fiber reinforced composite of claim 1, wherein the Young's modulus of the second fibers and the resin is in the range of 1 to 6 GPa and wherein a Young's modulus of the first fibers is at least 70 GPa.

3. The fiber reinforced composite of claim 1, wherein the plurality of first fibers are arranged in the biax-configuration such that an angle between the plurality of first fibers and the lengthwise direction is 45 degrees.

4. The fiber reinforced composite of claim 1, wherein the plurality of second fibers are arranged perpendicularly such that an angle between the plurality of second fibers and the lengthwise direction is in a range of 90±20 degrees.

5. A method for manufacturing a component for a wind turbine using the fiber reinforced composite of claim 1, comprising
   a) providing a fiber material comprising the plurality of first fibers and the plurality of second fibers,
   b) laying the fiber material onto a mold surface, and
   c) curing the resin impregnating the first and second fibers to form the component.

6. A fiber reinforced composite for manufacturing a component for a wind turbine, comprising
   a plurality of first fibers, the fibers being arranged in an unidirectional or biax-configuration,
   a plurality of second fibers, the second fibers being arranged perpendicularly with respect to a lengthwise direction of the first fibers, and
   a resin impregnating the first and second fibers such that the first and second fibers are embedded in the resin, wherein a Young's modulus of the resin equals a Young's modulus of the second fibers,
   wherein the second fibers are made of a thermoplastic material and/or a resin.

7. The fiber reinforced composite of claim 6, wherein the second fibers are made of epoxy resin, PET, polyester, acrylic, polycarbonate, polyimide, ABS and/or polypropylene.

8. A fiber reinforced composite for manufacturing a component for a wind turbine, comprising
   a plurality of first fibers, the fibers being arranged in an unidirectional or biax-configuration,
   a plurality of second fibers, the second fibers being arranged perpendicularly with respect to a lengthwise direction of the first fibers, and
   a resin impregnating the first and second fibers such that the first and second fibers are embedded in the resin, wherein a Young's modulus of the resin equals a Young's modulus of the second fibers,
   wherein the second fibers each comprise multiple filaments.

9. The fiber reinforced composite of claim 8, wherein each filament has a diameter ranging from 2 to 20 μm.

10. A fiber reinforced composite for manufacturing a component for a wind turbine, comprising
    a plurality of first fibers, the fibers being arranged in an unidirectional or biax-configuration,
    a plurality of second fibers, the second fibers being arranged perpendicularly with respect to a lengthwise direction of the first fibers, and
    a resin impregnating the first and second fibers such that the first and second fibers are embedded in the resin, wherein a Young's modulus of the resin equals a Young's modulus of the second fibers,
    wherein the second fibers are each formed as a single fiber.

11. The fiber reinforced composite of claim 10, wherein the diameter of a respective single fiber ranges from 50 to 500 μm.

12. A fiber reinforced composite for manufacturing a component for a wind turbine, comprising
    a plurality of first fibers, the fibers being arranged in an unidirectional or biax-configuration,
    a plurality of second fibers, the second fibers being arranged perpendicularly with respect to a lengthwise direction of the first fibers, and
    a resin impregnating the first and second fibers such that the first and second fibers are embedded in the resin, wherein a Young's modulus of the resin equals a Young's modulus of the second fibers,
    wherein the second fibers are attached to the first fibers by means of a stitching yarn.

13. A fiber reinforced composite for manufacturing a component for a wind turbine, comprising
    a plurality of first fibers, the fibers being arranged in an unidirectional or biax-configuration,
    a plurality of second fibers, the second fibers being arranged perpendicularly with respect to a lengthwise direction of the first fibers, and
    a resin impregnating the first and second fibers such that the first and second fibers are embedded in the resin, wherein a Young's modulus of the resin equals a Young's modulus of the second fibers,
    wherein the second fibers are treated with a coupling agent to improve a mechanical connection at an interface between the second fibers and the resin.

14. A fiber reinforced composite for manufacturing a component for a wind turbine, comprising
    a plurality of first fibers, the fibers being arranged in an unidirectional or biax-configuration,
    a plurality of second fibers, the second fibers being arranged perpendicularly with respect to a lengthwise direction of the first fibers, and
    a resin impregnating the first and second fibers such that the first and second fibers are embedded in the resin, wherein a Young's modulus of the resin equals a Young's modulus of the second fibers,
    wherein the resin is cured such that the fiber reinforced composite takes the form of the component for the wind turbine.

15. The fiber reinforced composite of claim 14, wherein the component comprises a rotor blade.

16. A fiber reinforced composite for manufacturing a component for a wind turbine, comprising
    a plurality of first fibers, the fibers being arranged in an unidirectional or biax-configuration,
    a plurality of second fibers, the second fibers being arranged with an angle between the plurality of second fibers and a lengthwise direction of the first fibers, said angle in a range between 45 and 90 degrees,
    a resin impregnating the first and second fibers such that the first and second fibers are embedded in the resin, wherein a Young's modulus of the resin is substantially equal to a Young's modulus of the second fibers; and
    a stitching yarn, wherein the second fibers are attached to the first fibers with the stitching yarn.

17. The fiber reinforced composite of claim 16, wherein the Young's modulus of the second fibers is greater than the Young's modulus of the resin and wherein the Young's modulus of the second fibers is up to 5 times the Young's modulus of the resin.

18. The fiber reinforced composite of claim 16, wherein the plurality of second fibers are arranged in a zigzag configuration such that the angle between the plurality of second fibers and the lengthwise direction is 45 degrees.

* * * * *